UNITED STATES PATENT OFFICE.

VICTOR G. BLOEDE, OF BALTIMORE, MARYLAND, ASSIGNOR OF ONE-HALF TO JOHN BANCROFT, OF WILMINGTON, DELAWARE.

RECOVERING ALKALI.

SPECIFICATION forming part of Letters Patent No. 403,870, dated May 21, 1889.

Application filed June 13, 1888. Serial No. 276,969. (No specimens.)

*To all whom it may concern:*

Be it known that I, VICTOR G. BLOEDE, residing in the city of Baltimore and State of Maryland, have invented certain new and useful Improvements for the Utilization of Waste or Spent Alkaline Liquors; and I do hereby declare that the following is a full, clear, and exact description of the invention, which will enable others skilled in the art to which it appertains to make and use the same.

This invention relates to an improved method of utilizing the spent alkaline liquors produced in the scouring of yarns and textile fabrics preparatory to bleaching, in the manufacture of soap and paper, and in other branches of industrial art. As is well known, these waste alkaline liquors, consisting, generally, of caustic or carbonate of soda or potash, are so charged with resinous, fatty, and coloring matters that their utilization has heretofore been limited, and although a number of methods have been suggested, most of such methods have proved impracticable, especially for any but highly-concentrated liquors.

By my improved process I have succeeded in utilizing the weakest liquors successfully and in removing from them the fatty and coloring matters to a sufficient extent to make such spent and hitherto useless liquors serve for the second or continuous operations.

Having now described the general object of my invention, I will proceed to give a detailed description of my method of utilization.

My process is based upon the fact that when alkaline liquors charged with fatty, resinous, or coloring matters are neutralized with sulphurous acid the weak fatty acids are displaced and separated from their alkaline combination in the form of a sediment or precipitate, and may then be readily removed by filtration or decantation. The sulphurous acid, in addition to separating the fatty and grosser coloring-matters by its superior affinity for the alkali, exerts a direct bleaching or destructive effect upon any residuary coloring-matter which might be otherwise retained by the liquor.

To carry out my process, in practice I run the spent alkaline liquors direct from the keir or boiler into any convenient tank or vessel, and preferably, although not necessarily, allow it to become quite cold. I then inject into it or otherwise treat the spent liquor so drawn off with sulphurous acid to the point of saturation, or, preferably, supersaturation. The spent alkaline liquor when so treated is of course thereby converted into a neutral or acid sulphite of soda, the coloring and fatty matters being almost wholly disassociated from it in the form of a more or less bulky precipitate which readily subsides on standing. In practice I have found it desirable to fully supersaturate the liquor with sulphurous acid, as the separation of the fatty matter, as well as the destruction of color, is then most complete. For many purposes, however, it is sufficient if the liquor is simply saturated to or a trifle beyond the saturation-point, or the liquor may be first supersaturated and then re-neutralized to any desired point by the addition of more or less of the original spent lye. After the saturation with sulphurous acid the solution of neutral or acid sulphite of soda thus formed is allowed to stand at rest until the precipitate of fatty, resinous, and coloring matters has completely subsided. The supernatant clear liquor is then drawn off and can be utilized, as sulphite or bisulphite of soda, for bleaching, scouring, pulping, or other purposes, or it may by further treatment be reconverted into carbonate or caustic soda. To accomplish this, I run the carefully-decanted liquor into a vessel, preferably provided with a mechanical agitator, and add to it carbonate or caustic lime or barium (or any other equivalent base) in equivalent proportion for the conversion of the sulphite of soda into carbonate or hydrate. In works where caustic soda is prepared from the carbonate the lime sludge produced in the operation of causticizing, and usually consisting of a mixture of hydrate and carbonate of lime, may be conveniently and economically employed for the conversion of the sulphite. By either of the foregoing treatments the sulphite of soda (or potash) is wholly or in part reconverted into carbonate or hydrate of soda, as the case may be, with the production of sulphite of lime as a residuary product. The latter compound may readily be utilized for the production of a further supply of sulphurous acid or marketed as a sulphite of lime.

Having now fully described my invention, what I desire to claim and secure by Letters Patent is—

The process herein described for the utilization or recovery of spent alkaline lyes, consisting in the saturation or supersaturation of said lyes with sulphurous acid, thereby effecting the separation of the impurities and producing a sulphite or bisulphite of the alkali available as such, and the further conversion of the said sulphites or bisulphites into hydrates or carbonates by subjecting them to the action of caustic or carbonate of lime, barium, or other equivalent compounds.

VICTOR G. BLOEDE.

Witnesses:
WM. G. OSTENDORF,
JOHN I. BROOKS.